US012610071B2

(12) United States Patent
Hendry et al.

(10) Patent No.: US 12,610,071 B2
(45) Date of Patent: Apr. 21, 2026

(54) IMAGE DECODING METHOD AND DEVICE THEREFOR

(71) Applicant: LG Electronics Inc., Seoul (KR)

(72) Inventors: Hendry Hendry, Seoul (KR);
Seunghwan Kim, Seoul, CA (US);
Seethal Paluri, Seoul (KR)

(73) Assignee: LG Electronics Inc., Seoul (KR)

( * ) Notice: Subject to any disclaimer, the term of this
patent is extended or adjusted under 35
U.S.C. 154(b) by 0 days.

(21) Appl. No.: 18/982,716

(22) Filed: Dec. 16, 2024

(65) Prior Publication Data

US 2025/0119564 A1     Apr. 10, 2025

Related U.S. Application Data

(63) Continuation of application No. 17/925,983, filed as
application No. PCT/KR2021/005601 on May 4,
2021, now Pat. No. 12,212,766.

(60) Provisional application No. 63/029,385, filed on May
22, 2020, provisional application No. 63/026,684,
filed on May 18, 2020.

(51) Int. Cl.
| | |
|---|---|
| *H04N 19/423* | (2014.01) |
| *H04N 19/172* | (2014.01) |
| *H04N 19/46* | (2014.01) |
| *H04N 19/70* | (2014.01) |

(52) U.S. Cl.
CPC ......... *H04N 19/423* (2014.11); *H04N 19/172*
(2014.11); *H04N 19/46* (2014.11); *H04N*
*19/70* (2014.11)

(58) Field of Classification Search
CPC .... H04N 19/423; H04N 19/172; H04N 19/46;
H04N 19/70; H04N 19/105; H04N
19/184; H04N 19/44
See application file for complete search history.

(56) References Cited

U.S. PATENT DOCUMENTS

| | | | | |
|---|---|---|---|---|
| 2003/0108099 | A1* | 6/2003 | Nagumo | ................... G06T 9/20 375/E7.199 |
| 2005/0053294 | A1* | 3/2005 | Mukerjee | ............... H04N 19/51 375/E7.125 |
| 2006/0126962 | A1* | 6/2006 | Sun | ...................... H04N 19/895 382/268 |
| 2015/0156501 | A1* | 6/2015 | Hannuksela | ........... H04N 19/70 375/240.12 |
| 2019/0342562 | A1* | 11/2019 | Hannuksela | ........... H04N 19/70 |

(Continued)

FOREIGN PATENT DOCUMENTS

| | | |
|---|---|---|
| JP | 2017-509252 A | 3/2017 |

OTHER PUBLICATIONS

Office Action in Japanese Appln. No. 2024-111475, mailed on Jul.
1, 2025, 5 pages (with English translation).

*Primary Examiner* — Joseph Suh
(74) *Attorney, Agent, or Firm* — Fish & Richardson P.C.

(57) ABSTRACT
An image decoding method performed by a decoding device
according to the present document comprises the steps of:
deriving a value of a variable on the basis of whether a
current picture is a first picture of a current access unit (AU)
that is a coded video sequence start access unit (CVSS) AU
instead of AU 0, wherein the variable indicates whether all
picture storage buffers within a decoded picture buffer
(DPB) are emptied without being output; updating the DPB
on the basis of the variable; and decoding the current picture
on the basis of the updated DPB.

15 Claims, 8 Drawing Sheets

(56)                    References Cited

U.S. PATENT DOCUMENTS

2021/0235123 A1*   7/2021   Choi ..................... H04N 19/136
2021/0289219 A1*   9/2021   Seregin .................. H04N 19/30
2021/0306672 A1*   9/2021   Bossen ................ H04N 19/117

* cited by examiner

FIG. 4

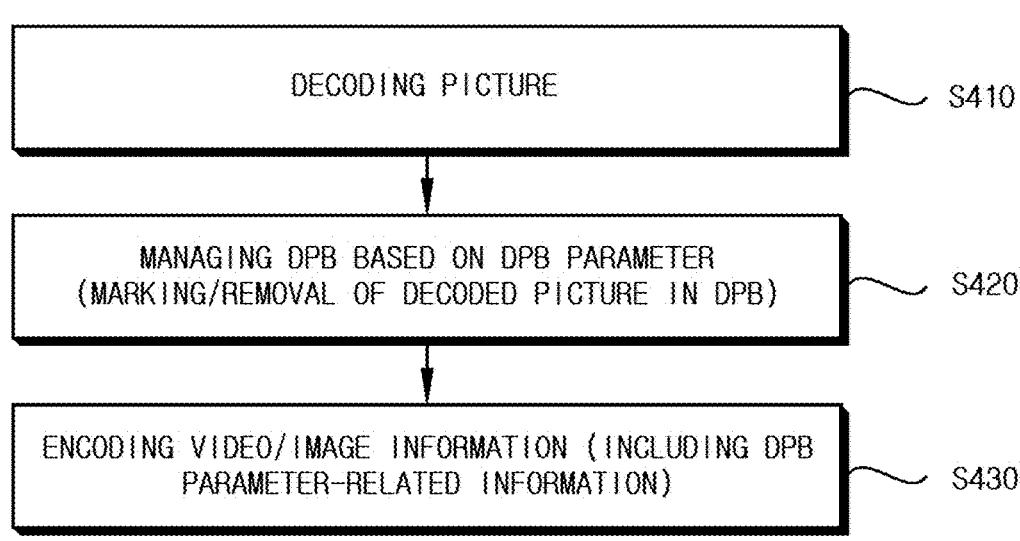

DECODING PICTURE ～ S410

MANAGING DPB BASED ON DPB PARAMETER
(MARKING/REMOVAL OF DECODED PICTURE IN DPB) ～ S420

ENCODING VIDEO/IMAGE INFORMATION (INCLUDING DPB
PARAMETER-RELATED INFORMATION) ～ S430

FIG. 5

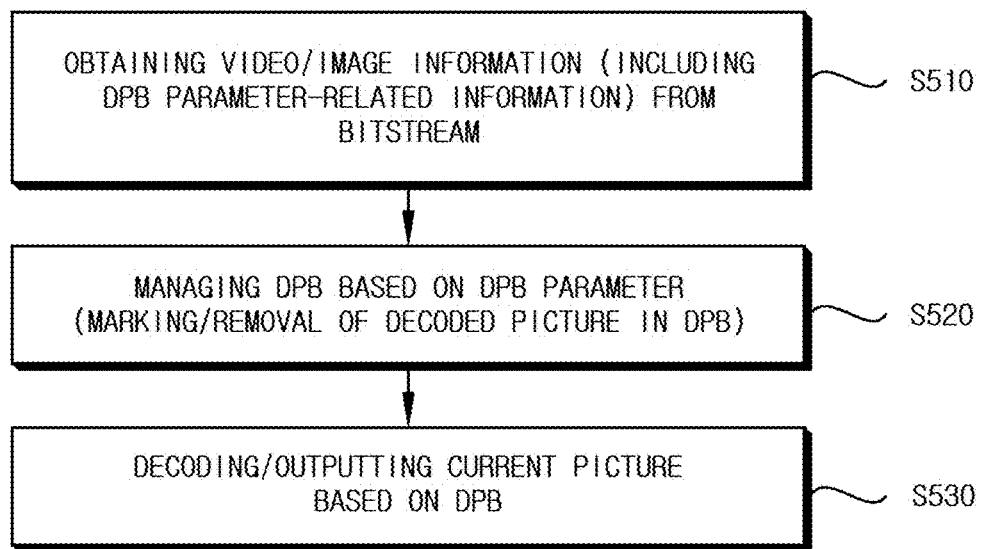

OBTAINING VIDEO/IMAGE INFORMATION (INCLUDING
DPB PARAMETER-RELATED INFORMATION) FROM
BITSTREAM ～ S510

MANAGING DPB BASED ON DPB PARAMETER
(MARKING/REMOVAL OF DECODED PICTURE IN DPB) ～ S520

DECODING/OUTPUTTING CURRENT PICTURE
BASED ON DPB ～ S530

DERIVING VALUE OF VARIABLE BASED ON WHETHER CURRENT PICTURE IS FIRST PICTURE OF CURRENT AU THAT IS CVSS AU OTHER THAN AU 0     S610

UPDATING DPB BASED ON VARIABLE     S620

ENCODING IMAGE INFORMATION FOR CURRENT PICTURE     S630

IMAGE DECODING METHOD AND DEVICE THEREFOR

CROSS-REFERENCE TO RELATED APPLICATIONS

This application is a continuation of U.S. application Ser. No. 17/925,983, filed on Nov. 17, 2022, which is a National Stage application under 35 U.S.C. § 371 of International Application No. PCT/KR2021/005601, filed on May 4, 2021, which claims the benefit of U.S. Provisional Application No. 63/029,385, filed on May 22, 2020, and 63/026,684, filed on May 18, 2020. The disclosures of the prior applications are incorporated by reference in their entirety.

TECHNICAL FIELD

The present disclosure relates to an image coding technique, and more particularly, to an image decoding method and an apparatus for performing a DPB management process in an image coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

The present disclosure provides a method and apparatus for improving image coding efficiency.

Another technical problem of the present disclosure is to provide a method and an apparatus for performing a DPB management process.

According to an embodiment of the present disclosure, an image decoding method performed by a decoding apparatus is provided. The method comprises deriving a value of a variable based on whether a current picture is the first picture of a current access unit (AU) that is a Coded Video Sequence Start Access Unit (CVSS AU) other than AU 0, updating the DPB based on the variable, and decoding the current picture based on the updated DPB. The variable indicates whether all picture storage buffers in a Decoded Picture Buffer (DPB) are emptied without output.

According to another embodiment of the present disclosure, a decoding apparatus for performing image decoding is provided. The decoding apparatus comprises a DPB for deriving a value of a variable based on whether a current picture is the first picture of a current access unit (AU) that is a Coded Video Sequence Start Access Unit (CVSS AU) other than AU 0 and updating the DPB based on the variable and a predictor for decoding the current picture based on the updated DPB. The variable indicates whether all picture storage buffers in a Decoded Picture Buffer (DPB) are emptied without output.

According to another embodiment of the present disclosure, an image encoding method performed by an encoding apparatus is provided. The method comprises deriving a value of a variable based on whether a current picture is the first picture of a current access unit (AU) that is a Coded Video Sequence Start Access Unit (CVSS AU) other than AU 0, updating the DPB based on the variable, and encoding image information for the current picture. The variable indicates whether all picture storage buffers in a Decoded Picture Buffer (DPB) are emptied without output.

According to another embodiment of the present disclosure, a video encoding apparatus is provided. The encoding apparatus comprises a DPB for deriving a value of a variable based on whether a current picture is the first picture of a current access unit (AU) that is a Coded Video Sequence Start Access Unit (CVSS AU) other than AU 0 and updating the DPB based on the variable and an entropy encoder for encoding image information for the current picture. The variable indicates whether all picture storage buffers in a Decoded Picture Buffer (DPB) are emptied without output.

According to another embodiment of the present disclosure, a computer-readable digital storage medium, in which a bitstream including image information causing an image decoding method to be performed is stored, is provided. In the computer-readable digital storage medium, the image decoding method comprises deriving a value of a variable based on whether a current picture is the first picture of a current access unit (AU) that is a Coded Video Sequence Start Access Unit (CVSS AU) other than AU 0, updating the DPB based on the variable, and decoding the current picture based on the updated DPB. The variable indicates whether all picture storage buffers in a Decoded Picture Buffer (DPB) are emptied without output.

According to the present disclosure, whether to perform the process of removing pictures in the DPB without outputting them may be determined only before decoding of the first picture of CVSS AU other than AU 0, instead of being determined before decoding of all pictures of CVSS AU other than AU 0. Through this, the DPB state affecting all layers in the CVS may not be changed for each picture, and coding efficiency may be improved.

According to the present disclosure, a variable indicating whether to remove pictures in the DPB without outputting may be derived only before decoding of the first picture of CVSS AU other than AU 0, not before decoding all pictures of CVSS AU other than AU 0. Through this, the DPB state affecting all layers in the CVS may not be changed for each picture, and coding efficiency may be improved.

BRIEF DESCRIPTION OF THE DRAWINGS

FIG. 4 exemplarily illustrates an encoding procedure according to an embodiment of the present disclosure.

FIG. 5 exemplarily illustrates a decoding procedure according to an embodiment of the present disclosure.

DETAILED DESCRIPTION

Figure 1:
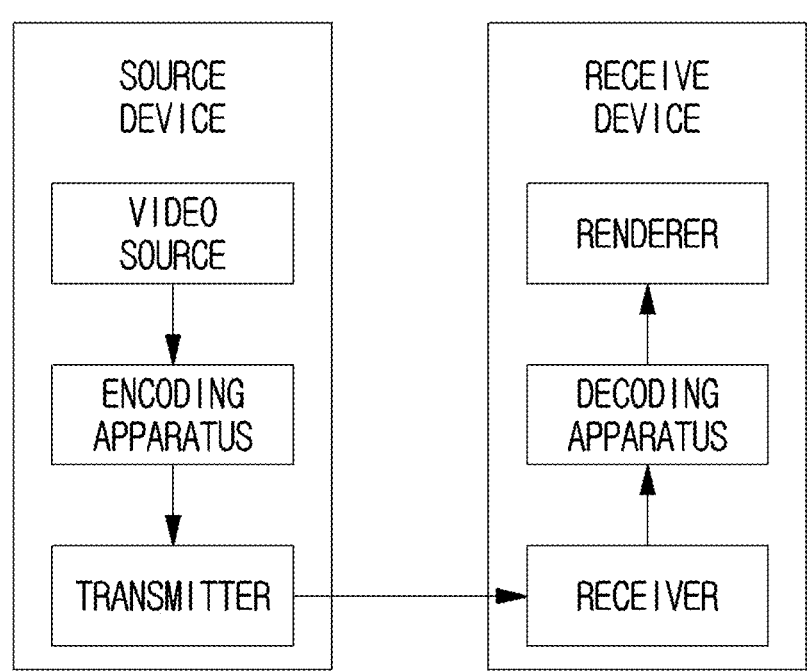
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
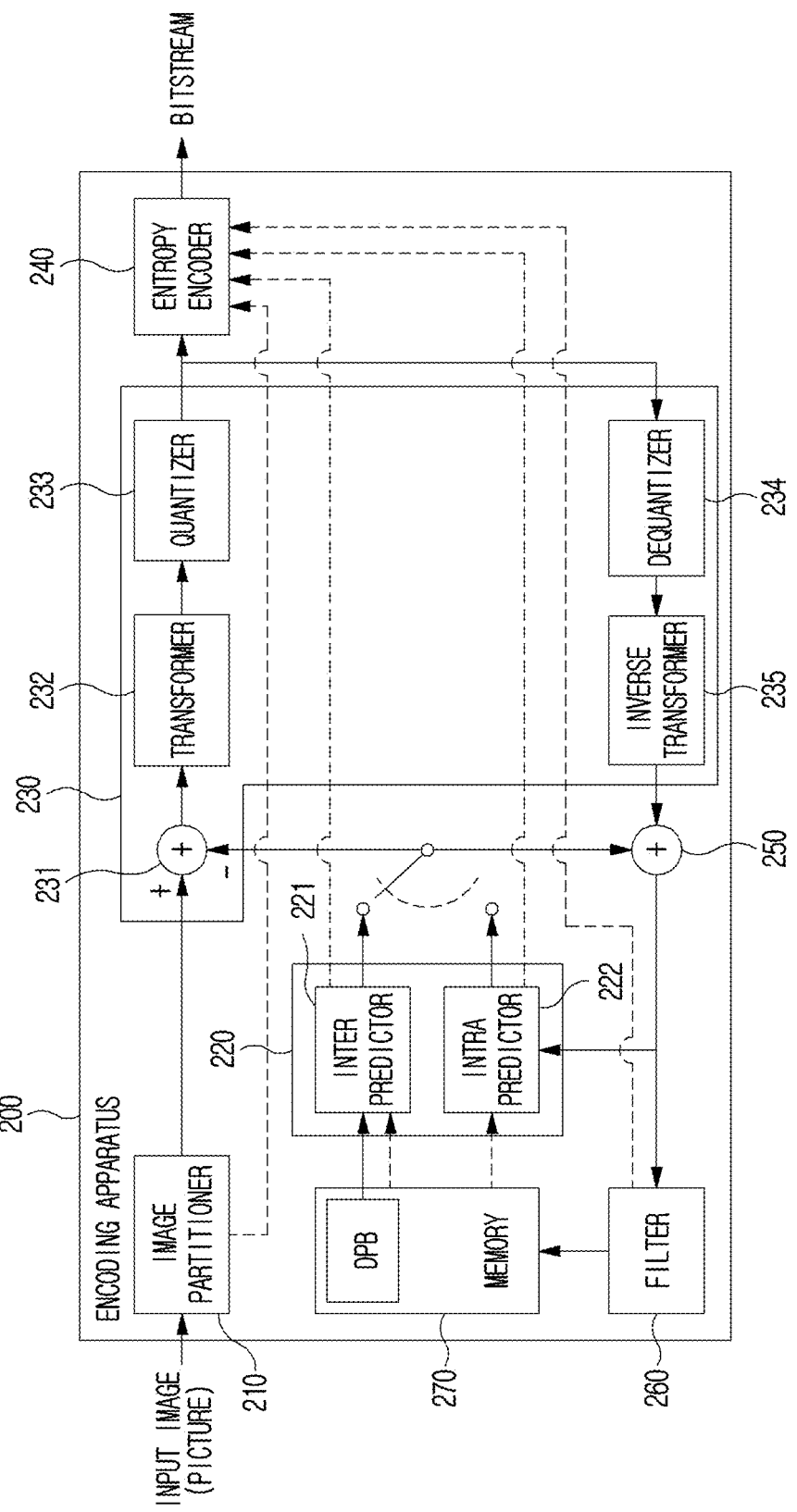
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
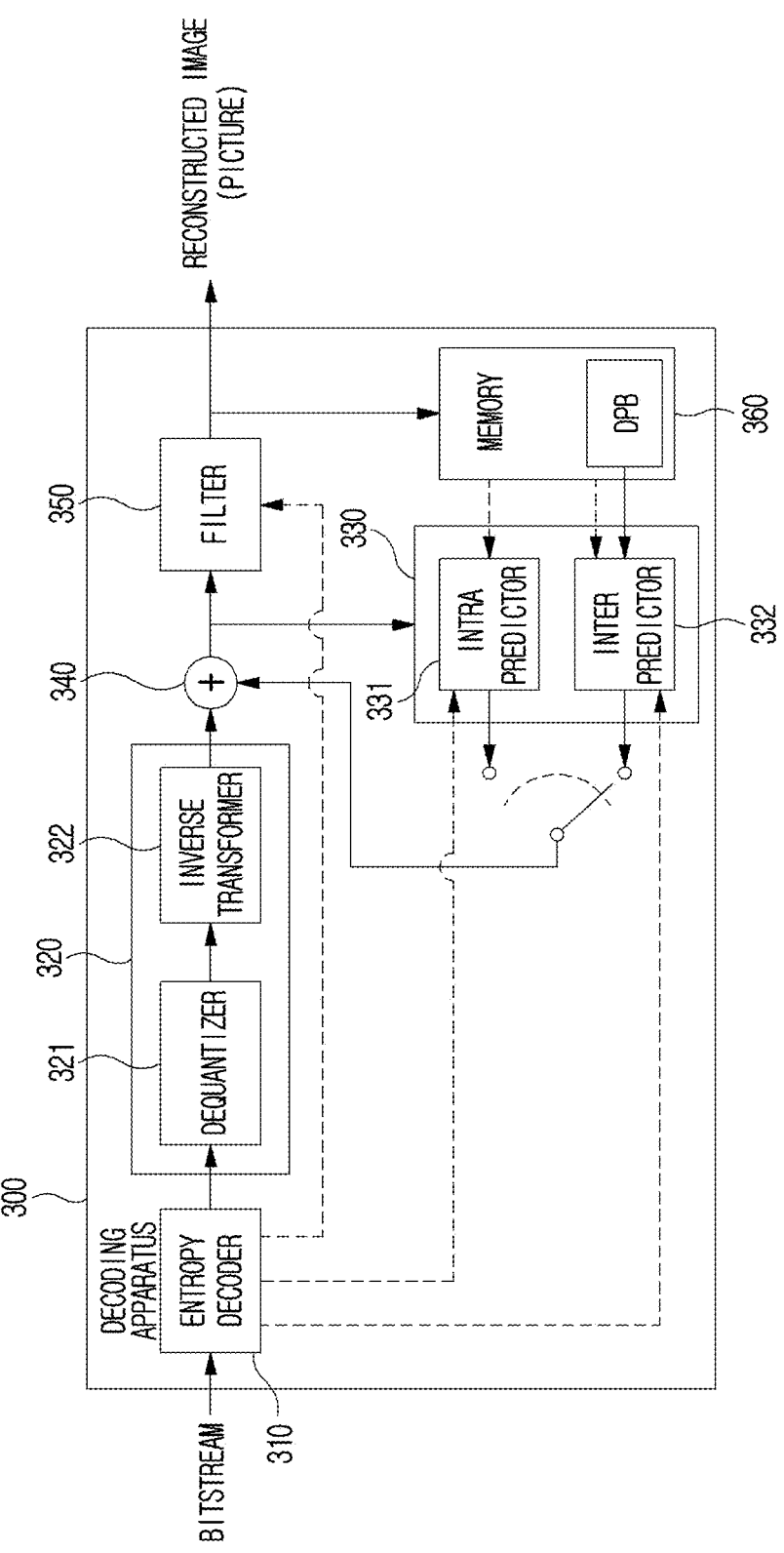
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, a picture output and removal process in a decoded picture buffer (DPB) may be performed. A picture output and removal process in the decoded picture buffer (DPB) in the existing VVC standard for a video/image coding system may be as shown in the table below.

TABLE 1

Picture output and removal from the DPB process.
VVC invoked picture output process once per picture before decoding of the current picture (but after parsing the slice header of the first slice of the current picture) as described below:
Removal of pictures from the DPB before decoding of the current picture
The removal of pictures from the DPB before decoding of the current picture (but after parsing the slice header of the first slice of the current picture) happens instantaneously at the CPB removal time of the first DU of AU n (containing the current picture) and proceeds as follows:
- The decoding process for reference picture list construction as specified in clause 8.3.2 is invoked and the decoding process for reference picture marking as specified in clause 8.3.3 is invoked.
- When the current AU is a CVSS AU that is not AU 0, the following ordered steps are applied:
  1. The variable NoOutputOfPriorPicsFlag is derived for the decoder under test as follows:
    - If the value of PicWidthMaxInSamplesY, PicHeightMaxInSamplesY, MaxChromaFormat, MaxBitDepthMinus8, or max_dec_pic_buffering_minus1[ Htid ] derived for the current AU is different from the value of PicWidthMaxInSamplesY, PicHeightMaxInSamplesY, MaxChromaFormat, MaxBitDepthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.
      NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.
    - Otherwise, NoOutputOfPriorPicsFlag is set equal to ph_no_output_of_prior_pics_flag of the current AU.
  2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.
- When both of the following conditions are true for any pictures k in the DPB, all such pictures k in the DPB are removed from the DPB:
  - picture k is marked as "unused for reference".
  - picture k has PictureOutputFlag equal to 0 or its DPB output time is less than or equal to the CPB removal time of the first DU (denoted as DU m) of the current picture n; i.e., DpbOutputTime[ k ] is less than or equal to DuCpbRemovalTime[ m ].
- For each picture that is removed from the DPB, the DPB fullness is decremented by one.
...
...
Output and removal of pictures from the DPB
The output and removal of pictures from the DPB before the decoding of the current picture (but after parsing the slice header of the first slice of the current picture) happens instantaneously when the first DU of the AU containing the current picture is removed from the CPB and proceeds as follows:
- The decoding process for reference picture list construction as specified in clause 8.3.2 and decoding process for reference picture marking as specified in clause 8.3.3 are invoked.
- If the current AU is a CVSS AU that is not AU 0, the following ordered steps are applied:
  1. The variable NoOutputOfPriorPicsFlag is derived for the decoder under test as follows:
    - If the value of PicWidthMaxInSamplesY, PicHeightMaxInSamplesY, MaxChromaFormat, MaxBitDepthMinus8, or max_dec_pic_buffering_minus1[ Htid ]

TABLE 1-continued derived for the current AU is different from the value of PicWidthMaxInSamplesY, PicHeightMaxInSamplesY, MaxChromaFormat, MaxBitDepthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.

NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.

- Otherwise, NoOutputOfPriorPicsFlag is set equal to ph_no_output_of_prior_pics_flag of the current AU.

2.  The value of NoOutputOfPriorPicsFlag derived for the decoder under test is applied for the HRD as follows:
   - If NoOutputOfPriorPicsFlag is equal to 1, all picture storage buffers in the DPB are emptied without output of the pictures they contain and the DPB fullness is set equal to 0.
   - Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.

- Otherwise (the current AU is not a CVSS AU), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
-   The number of pictures in the DPB that are marked as "needed for output" is greater than max_num_reorder_pics[ Htid ].
-   max_latency_increase_plus1[ Htid ] is not equal to 0 and there is at least one picture in the DPB that is marked as "needed for output" for which the associated variable PicLatencyCount is greater than or equal to MaxLatencyPictures[ Htid ].
-   The number of pictures in the DPB is greater than or equal to max_dec_pic_buffering_minus1[ Htid ] + 1.

For example, according to the VVC standard for video/image coding system, before decoding the current picture (but after parsing the slice header of the first slice of the current picture), the picture output process may be invoked once per picture as disclosed in the table above.

Also, for example, referring to Table 1, when the current access unit (AU) is a coded video sequence start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1 [Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to a Hypothetical Reference Decoder (HRD). Therefore, when the value of NoOutputOfPriorPicsFlag is 1, all picture storage buffers of DPB may be emptied without output of the pictures they contain, and the DPB fullness may be set to 0.

Also, for example, referring to Table 1, when all of the following conditions are true for any pictures k of the DPB, all such pictures k of the DPB may be removed from the DPB.

picture k is marked as "unused for reference".

picture k has a PictureOutputFlag equal to 0 or the DPB output time of the picture k is less than or equal to the CPB removal time of the first Decoding Unit (DU) (denoted as DU m) of the current picture n; that is, DpbOutputTime[k] is less than or equal to DuCpbRemovalTime[m].

Also, for example, referring to Table 1, when the current access unit (AU) is a coded video sequence start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to the HRD (Hypothetical Reference Decoder) as follows.

For example, when the value of NoOutputOfPriorPics-Flag is 1, all picture storage buffers of the DPB may be emptied without output of the pictures they contain, and the DPB fullness may be set to 0.

Otherwise (i.e., when the value of NoOutputOfPriorPics-Flag is 0), all picture storage buffers containing a picture marked as "not needed for output" and "unused for reference" in the DPB may be emptied (without output), and all non-empty picture storage buffers in the DPB may be emptied by repeatedly invoking the "bumping" process specified in clause C.5.2.4 (of VVC standard) and the DPB fullness may be set to 0.

Meanwhile, the bumping process may consist of steps in the following order.

1. The picture (or pictures) output first may be selected as the picture having the smallest PicOrderCntVal value among all pictures of the DPB marked as "needed for output".
2. Each of the pictures, in ascending nuh_layer_id order, may be cropped using a conformance cropping window for the picture, the cropped picture may be output, and the picture may be marked as "not needed for output".
3. Each picture storage buffer containing a picture which is marked as "unused for reference" and is one of the cropped and output pictures may be emptied, and the fullness of the DPB may be decremented by 1.

Also, for example, referring to Table 1, when the current AU is not the CVSS AU, all picture storage buffers containing a picture marked as "not needed for output" and "unused for reference" may be emptied (without output). For each picture storage buffer, the DPB fullness may be decremented by 1. Also, when one or more of the conditions described below are true, the "bumping" process specified in clause C.5.2.4 (of VVC standard) may be invoked repeatedly while further decrementing the DPB fullness by 1 for each additional picture storage buffer that is emptied, until none of the following conditions are true.

The number of pictures in the DPB marked as "needed for output" is greater than max_num_reorder_pics[Htid].

max_latency_increase_plus1[Htid] is not equal to 0 and there is at least one picture in the DPB that is marked as "needed for output" and for which the associated variable PicLatencyCount is greater than or equal to MaxLatencyPictures[Htid].

The number of pictures in the DPB is greater than or equal to max_dec_pic_buffering_minus1[Htid]+1.

On the other hand, the existing VVC standard for the picture output and removal process described above may have the following problems.

For example, first, the picture may be marked as "used for short-term reference" after all slices of the picture have been decoded. Due to this, when the picture is decoded, the picture may not be in a clear status in the DPB. As a result, the number of picture storages of the DPB may be affected.

Second, assignment of an output status (i.e., need for output) of a picture may be performed during the bumping process. According to the existing VVC standard, the process may not be invoked for a picture of an AU that is a coded video sequence start AU. Due to this, the value of PicLatencyCount related to the corresponding picture may not be initialized.

As described above, the process of output and removal of pictures in the DPB may be invoked once per picture, but the process may affect the state of the DPB shared by all layers of the CVS (i.e., states of pictures stored in the DPB). Considering the above facts, the process of deriving NoOutputOfPriorPicsFlag and removing a picture from the DPB based on the value of NoOutputOfPriorPicsFlag may have a problem. According to the existing video/image standard, for all pictures of CVSS AU other than AU 0, the process of deriving and removing pictures from the DPB based on the value of the flag (i.e., NoOutputOfPriorPicsFlag) may be invoked. Execution of the process as described above may be ok only for the first picture. The process starting from the second picture may remove the previous picture from the DPB before the previous picture (i.e., the picture of the previous order in decoding order) is output. This behavior may not be correct decoder behavior.

Accordingly, the present disclosure proposes a solution to the above-described problem. The proposed embodiments may be applied individually or in combination.

As an example, the process of deriving the value of a flag or variable indicating whether to remove the reference picture from the DPB without outputting it may be invoked only once per access unit (AU). That is, for example, a method such that the process of deriving the value of a flag or variable indicating whether to remove the reference picture of the DPB without outputting it is invoked only once per access unit (AU) may be proposed. Here, the variable may be NoOutputOfPriorPicsFlag.

In addition, as an example, the process of deriving the value of NoOutputOfPriorPicsFlag may be invoked before the decoding process of the first picture in the coded video sequence start AU (CVSS AU), but after parsing the slice header of the first slice of the current picture. That is, for example, a method, in which the process of deriving the value of NoOutputOfPriorPicsFlag is performed before the decoding process of the first picture of the CVSS AU, but after the slice header of the first slice of the current picture is parsed, may be proposed.

Also, as an example, when NoOutputOfPriorPicsFlag is 1, the process of removing the picture stored in the DPB without outputting it may be invoked only once per AU. That is, for example, when NoOutputOfPriorPicsFlag is 1, a method, in which the process of removing the picture stored in the DPB without outputting it is invoked only once per AU, may be proposed.

In addition, as an example, when NoOutputOfPriorPics-Flag is 1, the process of removing the picture stored in the DPB without outputting it may be invoked before the decoding process of the first picture in CVSS AU, but after parsing the slice header of the first slice of the current picture. That is, for example, when NoOutputOfPriorPics-Flag is 1, a method, in which the process of removing the picture stored in the DPB without outputting it is invoked before the decoding process of the first picture in the CVSS AU, but after parsing the slice header of the first slice of the current picture, may be proposed.

Also, as an example, the removal of the picture in the above-described embodiments may not include the removal of the current picture in the DPB. That is, for example, a method, in which the removal of the picture in the above embodiments does not include the removal of the current picture in the DPB, may be proposed.

The above-described embodiments may be implemented as follows. For example, the above-described embodiments may be represented based on the VVC standard specification as described below.

TABLE 2

Removal of pictures from the DPB before decoding of the current picture

The removal of pictures from the DPB before decoding of the current picture (but after parsing the slice header of the first slice of the current picture) happens instantaneously at the CPB removal time of the first DU of AU n (containing the current picture) and proceeds as follows:

- The decoding process for reference picture list construction as specified in clause 8.3.2 is invoked and the decoding process for reference picture marking as specified in clause 8.3.3 is invoked.
- When the current picture is the first picture and the current AU (i.e., the AU that contains the current picture) is a CVSS AU that is not AU 0, the following ordered steps are applied:
    1. The variable NoOutputOfPriorPicsFlag is derived for the decoder under test as follows:
        - If the value of PicWidthMaxInSamplesY, PicHeightMaxInSamplesY, MaxChromaFormat, MaxBitDepthMinus8, or max_dec_pic_buffering_minus1[ Htid ] derived for the current AU is different from the value of PicWidthMaxInSamplesY, PicHeightMaxInSamplesY, MaxChromaFormat, MaxBitDepthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.
            NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.
        - Otherwise, NoOutputOfPriorPicsFlag is set equal to ph_no_output_of_prior_pics_flag of the current AU.
    2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.
- When the current AU is not a CVSS AU or the current AU is a CVSS AU that is not AU 0 but the current picture is not the first picture in the current AU and when both of the following conditions are true for any pictures k in the DPB, all such pictures k in the DPB are removed from the DPB:
    - picture k is marked as "unused for reference".
    - picture k has PictureOutputFlag equal to 0 or its DPB output time is less than or equal to the CPB removal time of the first DU (denoted as DU m) of the current picture n; i.e., DpbOutputTime[ k ] is less than or equal to DuCpbRemovalTime[ m ].
    - For each picture that is removed from the DPB, the DPB fullness is decremented by one.
...
...

Output and removal of pictures from the DPB

The output and removal of pictures from the DPB before the decoding of the current picture (but after parsing the slice header of the first slice of the current picture) happens instantaneously when the first DU of the AU containing the current picture is removed from the CPB and proceeds as follows:

- The decoding process for reference picture list construction as specified in clause 8.3.2 and decoding process for reference picture marking as specified in clause 8.3.3 are invoked.
- If the current picture is the first picture and the current AU (i.e., the AU that contains the current picture) is a CVSS AU that is not AU 0, the following ordered steps are applied:
    1. The variable NoOutputOfPriorPicsFlag is derived for the decoder under test as follows:
        - If the value of PicWidthMaxInSamplesY, PicHeightMaxInSamplesY, MaxChromaFormat, MaxBitDepthMinus8, or max_dec_pic_buffering_minus1[ Htid ] derived for the current AU is different from the value of PicWidthMaxInSamplesY, PicHeightMaxInSamplesY, MaxChromaFormat, MaxBitDepthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.
            NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.
        - Otherwise, NoOutputOfPriorPicsFlag is set equal to ph_no_output_of_prior_pics_flag of the current AU.
    2. The value of NoOutputOfPriorPicsFlag derived for the decoder under test is applied for the HRD as follows:
        - If NoOutputOfPriorPicsFlag is equal to 1, all picture storage buffers in the DPB are emptied without output of the pictures they contain and the DPB fullness is set equal to 0.
        - Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.
- Otherwise (the current AU is not a CVSS AU or the current AU is a CVSS AU that is not AU 0 but the current picture is not the first picture in the current AU), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

TABLE 2-continued

- The number of pictures in the DPB that are marked as "needed for output" is greater than max_num_reorder_pics[ Htid ].
- max_latency_increase_plus1[ Htid ] is not equal to 0 and there is at least one picture in the DPB that is marked as "needed for output" for which the associated variable PicLatencyCount is greater than or equal to MaxLatencyPictures[ Htid ].
- The number of pictures in the DPB is greater than or equal to max_dec_pic_buffering_minus1[ Htid ] + 1.

...

For example, referring to Table 2, when the current picture is the first picture and the current AU (i.e., AU including the current picture) is a Coded Video Sequence Start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to a Hypothetical Reference Decoder (HRD). Therefore, when the value of NoOutputOfPriorPicsFlag is 1, all picture storage buffers of DPB may be emptied without output of the pictures they contain, and the DPB fullness may be set to 0.

In addition, for example, referring to Table 2, when the current AU is not a CVSS AU or the current AU is a CVSS AU other than AU 0 but the current picture is not the first picture in the current AU and when all of the following conditions are true for any pictures k in the DPB, all such pictures k in the DPB may be removed from the DPB.

picture k is marked as "unused for reference".

picture k has a PictureOutputFlag equal to 0 or the DPB output time of the picture k is less than or equal to the CPB removal time of the first Decoding Unit (DU) (denoted as DU m) of the current picture n; that is, DpbOutputTime[k] is less than or equal to DuCpbRemovalTime[m].

Also, for example, referring to Table 2, when the current picture is the first picture and the current AU (i.e., AU including the current picture) is a coded video sequence start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid]

derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to a Hypothetical Reference Decoder (HRD) as follows.

For example, when the value of NoOutputOfPriorPicsFlag is 1, all picture storage buffers of the DPB may be emptied without output of the pictures they contain, and the DPB fullness may be set to 0.

Otherwise (i.e., when the value of NoOutputOfPriorPicsFlag is 0), all picture storage buffers containing a picture marked as "not needed for output" and "unused for reference" in the DPB may be emptied (without output), and all non-empty picture storage buffers in the DPB may be emptied by repeatedly invoking the "bumping" process specified in clause C.5.2.4 (of VVC standard) and the DPB fullness may be set to 0.

Also, for example, referring to Table 2, when the current AU is not the CVSS AU or the current AU is the CVSS AU other than AU 0 but the current picture is not the first picture of the current AU, all picture storage buffers containing a picture marked as "not needed for output" and "unused for reference" may be emptied (without output). For each picture storage buffer that is emptied, the DPB fullness may be decremented by 1. Also, when one or more of the conditions described below are true, the "bumping" process specified in clause C.5.2.4 (of VVC standard) may be invoked repeatedly while further decrementing the DPB fullness by 1 for each additional picture storage buffer that is emptied, until none of the following conditions are true.

The number of pictures in the DPB marked as "needed for output" is greater than max_num_reorder_pics[Htid].

max_latency_increase_plus1[Htid] is not equal to 0 and there is at least one picture in the DPB that is marked as "needed for output" and for which the associated variable PicLatencyCount is greater than or equal to MaxLatencyPictures[Htid].

The number of pictures in the DPB is greater than or equal to max_dec_pic_buffering_minus1[Htid]+1.

Alternatively, the above-described embodiments may be implemented as follows. For example, the above-described embodiments may be represented based on the VVC standard specification as described below.

TABLE 3

Removal of pictures from the DPB before decoding of the current picture
The removal of pictures from the DPB before decoding of the current picture (but after parsing the slice header of the first slice of the current picture) happens instantaneously at the CPB removal time TABLE 3-continued of the first DU of AU n (containing the current picture) and proceeds as follows:
- The decoding process for reference picture list construction as specified in clause 8.3.2 is
  invoked and the decoding process for reference picture marking as specified in clause 8.3.3 is
  invoked.
- When the current picture is the first picture of the current AU and the current AU is a CVSS AU
  that is not AU 0, the following ordered steps are applied:
  1. The variable NoOutputOfPriorPicsFlag is derived for the decoder under test as follows:
     - If the value of PicWidthMaxInSamplesY, PicHeightMaxInSamplesY,
       MaxChromaFormat, MaxBitDepthMinus8, or max_dec_pic_buffering_minus1[ Htid ]
       derived for the current AU is different from the value of PicWidthMaxInSamplesY,
       PicHeightMaxInSamplesY, MaxChromaFormat, MaxBitDepthMinus8, or
       max_dec_pic_buffering_minus1[ Htid ], respectively, derived for the preceding AU in
       decoding order, NoOutputOfPriorPicsFlag may (but should not) be set equal to 1 by
       the decoder under test, regardless of the value of ph_no_output_of_prior_pics_flag of
       the current AU.
          NOTE - Although setting NoOutputOfPriorPicsFlag equal to
          ph_no_output_of_prior_pics_flag of the current AU is preferred under these
          conditions, the decoder under test is allowed to set NoOutputOfPriorPicsFlag
          equal to 1 in this case.
     - Otherwise, NoOutputOfPriorPicsFlag is set equal to ph_no_output_of_prior_pics_flag
       of the current AU.
  2. The value of NoOutputOfPriorPicsFlag derived for the decoder under test is applied for the
     HRD, such that when the value of NoOutputOfPriorPicsFlag is equal to 1, all picture
     storage buffers in the DPB are emptied without output of the pictures they contain, and the
     DPB fullness is set equal to 0.
- When the current AU is not a CVSS AU or the current AU is a CVSS AU that is not AU 0 but
  the current picture is not the first picture of the current AU and when both of the following
  conditions are true for any pictures k in the DPB, all such pictures k in the DPB are removed
  from the DPB:
  - picture k is marked as "unused for reference".
  - picture k has PictureOutputFlag equal to 0 or its DPB output time is less than or equal to the
    CPB removal time of the first DU (denoted as DU m) of the current picture n; i.e.,
    DpbOutputTime[ k ] is less than or equal to DuCpbRemovalTime[ m ].
  - For each picture that is removed from the DPB, the DPB fullness is decremented by one.
...
...
Output and removal of pictures from the DPB
The output and removal of pictures from the DPB before the decoding of the current picture (but after
parsing the slice header of the first slice of the current picture) happens instantaneously when the first
DU of the AU containing the current picture is removed from the CPB and proceeds as follows:
- The decoding process for reference picture list construction as specified in clause 8.3.2 and
  decoding process for reference picture marking as specified in clause 8.3.3 are invoked.
- If the current picture is the first picture of the current AU and the current AU is a CVSS AU that
  is not AU 0, the following ordered steps are applied:
  1. The variable NoOutputOfPriorPicsFlag is derived for the decoder under test as follows:
     - If the value of PicWidthMaxInSamplesY, PicHeightMaxInSamplesY,
       MaxChromaFormat, MaxBitDepthMinus8, or max_dec_pic_buffering_minus1[ Htid ]
       derived for the current AU is different from the value of PicWidthMaxInSamplesY,
       PicHeightMaxInSamplesY, MaxChromaFormat, MaxBitDepthMinus8, or
       max_dec_pic_buffering_minus1[ Htid ], respectively, derived for the preceding AU in
       decoding order, NoOutputOfPriorPicsFlag may (but should not) be set equal to 1 by
       the decoder under test, regardless of the value of ph_no_output_of_prior_pics_flag of
       the current AU.
          NOTE - Although setting NoOutputOfPriorPicsFlag equal to
          ph_no_output_of_prior_pics_flag of the current AU is preferred under these
          conditions, the decoder under test is allowed to set NoOutputOfPriorPicsFlag
          equal to 1 in this case.
     - Otherwise, NoOutputOfPriorPicsFlag is set equal to ph_no_output_of_prior_pics_flag
       of the current AU.
  2. The value of NoOutputOfPriorPicsFlag derived for the decoder under test is applied for the
     HRD as follows:
     - If NoOutputOfPriorPicsFlag is equal to 1, all picture storage buffers in the DPB are
       emptied without output of the pictures they contain and the DPB fullness is set equal to
       0.
     - Otherwise (NoOutputOfPriorPicsFlag is equal to 0), all picture storage buffers
       containing a picture that is marked as "not needed for output" and "unused for
       reference" are emptied (without output) and all non-empty picture storage buffers in
       the DPB are emptied by repeatedly invoking the "bumping" process specified in clause
       C.5.2.4 and the DPB fullness is set equal to 0.
- Otherwise (the current AU is not a CVSS AU or the current AU is a CVSS AU that is not AU 0
  but the current picture is not the first picture in the current AU), all picture storage buffers
  containing a picture which are marked as "not needed for output" and "unused for reference" are
  emptied (without output). For each picture storage buffer that is emptied, the DPB fullness is
  decremented by one. When one or more of the following conditions are true, the "bumping"
  process specified in clause C.5.2.4 is invoked repeatedly while further decrementing the DPB
  fullness by one for each additional picture storage buffer that is emptied, until none of the
  following conditions are true:
  - The number of pictures in the DPB that are marked as "needed for output" is greater than
    max_num_reorder_pics[ Htid ].
  - max_latency_increase_plus1[ Htid ] is not equal to 0 and there is at least one picture in the

|

TABLE 3-continued

DPB that is marked as "needed for output" for which the associated variable PicLatencyCount
is greater than or equal to MaxLatencyPictures[ Htid ].
- The number of pictures in the DPB is greater than or equal to
  max_dec_pic_buffering_minus1[ Htid ] + 1.

For example, referring to Table 3, when the current picture is the first picture of the current AU and the current AU is a Coded Video Sequence Start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to a Hypothetical Reference Decoder (HRD). Therefore, when the value of NoOutputOfPriorPicsFlag is 1, all picture storage buffers of DPB may be emptied without output of the pictures they contain, and the DPB fullness may be set to 0.

In addition, for example, referring to Table 3, when current AU is not a CVSS AU or the current AU is a CVSS AU other than AU 0 but the current picture is not the first picture of the current AU and when all of the following conditions are true for any pictures k in the DPB, all such pictures k in the DPB may be removed from the DPB.

picture k is marked as "unused for reference".

picture k has a PictureOutputFlag equal to 0 or the DPB output time of the picture k is less than or equal to the CPB removal time of the first Decoding Unit (DU) (denoted as DU m) of the current picture n; that is, DpbOutputTime[k] is less than or equal to DuCpbRemovalTime[m].

Also, for example, referring to Table 3, when the current picture is the first picture and the current access unit (AU) is a coded video sequence start AU (CVSS AU) other than AU 0, the steps in the following order may be applied.

First, the variable NoOutputOfPriorPicsFlag may be derived as follows for the decoder under test.

When the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag derived for the decoder under test may be applied to a Hypothetical Reference Decoder (HRD) as follows.

For example, when the value of NoOutputOfPriorPicsFlag is 1, all picture storage buffers of the DPB may be emptied without output of the pictures they contain, and the DPB fullness may be set to 0.

Otherwise (i.e., when the value of NoOutputOfPriorPicsFlag is 0), all picture storage buffers containing a picture marked as "not needed for output" and "unused for reference" in the DPB may be emptied (without output), and all non-empty picture storage buffers in the DPB may be emptied by repeatedly invoking the "bumping" process specified in clause C.5.2.4 (of VVC standard) and the DPB fullness may be set to 0.

Also, for example, referring to Table 3, when the current AU is not the CVSS AU or the current AU is the CVSS AU other than AU 0 but the current picture is not the first picture of the current AU, all picture storage buffers containing a picture marked as "not needed for output" and "unused for reference" may be emptied (without output). For each picture storage buffer that is emptied, the DPB fullness may be decremented by 1. Also, when one or more of the conditions described below are true, the "bumping" process specified in clause C.5.2.4 (of VVC standard) may be invoked repeatedly while further decrementing the DPB fullness by 1 for each additional picture storage buffer that is emptied, until none of the following conditions are true.

The number of pictures in the DPB marked as "needed for output" is greater than max_num_reorder_pics[Htid].

max_latency_increase_plus1[Htid] is not equal to 0 and there is at least one picture in the DPB that is marked as "needed for output" and for which the associated variable PicLatencyCount is greater than or equal to MaxLatencyPictures[Htid].

The number of pictures in the DPB is greater than or equal to max_dec_pic_buffering_minus1[Htid]+1.

Meanwhile, for example, embodiment(s) may be applied according to the following procedure. One or more of the steps of the procedure to be described later may be omitted.

FIG. 4 exemplarily illustrates an encoding procedure according to an embodiment of the present disclosure.

Referring to FIG. 4, the encoding apparatus decodes (restores) the picture (S400). The encoding apparatus may decode the picture of the current AU.

The encoding apparatus manages the DPB based on the DPB parameter (S410). Here, DPB management may be referred to as DPB update. The DPB management process may include a process of marking and/or removing a decoded picture in the DPB. The decoded picture may be used as a reference for inter prediction of a subsequence picture. That is, the decoded picture may be used as a reference picture for inter prediction of a picture following in decoding order. Each decoded picture may be basically inserted into the DPB. In addition, the DPB may generally be updated before decoding the current picture. When the layer related to the DPB is not the output layer (or the DPB parameter is not related to the output layer) and is the reference layer, the decoded picture in the DPB may not be output. If the layer related to the DPB (or DPB parameter) is the output layer, the decoded picture in the DPB may be output based on the DPB and/or the DPB parameter. DPB management may include outputting the decoded picture from the DPB.

The encoding apparatus encodes image information including information related to the DPB parameter (S420). The information related to the DPB parameter may include the information/syntax element disclosed in the above-described embodiments and/or the syntax element disclosed in a table to be described later.

TABLE 4

| | Descriptor |
|---|---|
| video_parameter_set_rbsp( ) { | |
| ... | |
|   if( !vps_all_independent_layers_flag ) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus1 > 0 ) | |
|       vps_sublayer_dpb_params_present_flag | u(1) |
|   } | |
|   for( i = 0; i < vps_num_dpb_params; i++ ) { | |
|     dpb_size_only_flag[ i ] | u(1) |
|     if( vps_max_sublayers_minus1 > 0 && !vps_all_layers_same_num_subl ayers_flag ) | |
|       dpb_max_temporal_id[ i ] | u(3) |
|     dpb_parameters( dpb_size_only_flag[ i ], dpb_max_temporal_id[ i ], | |
|       vps_sublayer_dpb_params_present_flag ) | |
|   } | |
|   for( i = 0; i < vps_max_layers_minus1 && vps_num_dpb_params > 1; i++ ) { | |
|     if( !vps_independent_layer_flag[ i ] ) | |
|       layer_output_dpb_params_idx[ i ] | ue(v) |
|     if( LayerUsedAsRefLayerFlag[ i ] && !same_dpb_size_output_or_nonou tput_flag ) | |
|       layer_nonoutput_dpb_params_idx[ i ] | ue(v) |
|   } | |
|   ... | |
| } | |

For example, Table 4 described above may represent a Video Parameter Set (VPS) including syntax elements for the DPB parameter to be signaled.

Semantics for the syntax elements shown in Table 4 above may be as follows.

TABLE 5 vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.
same_dpb_size_output_or_nonoutput_flag equal to 1 specifies that there is no layer_nonoutput_dpb_params_idx[ i ] syntax element present in the VPS.
same_dpb_size_output_or_nonoutput_flag equal to 0 specifies that there may or may not be layer_nonoutput_dpb_params_idx[ i ] syntax elements present in the VPS.
vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to 0.
dpb_size_only_flag[ i ] equal to 1 specifies that the max_num_reorder_pics[ ] and max_latency_increase_plus1[ ] syntax elements are not present in the i-th dpb_parameters( ) syntax strucures the VPS. dpb_size_only_flag[ i ] equal to 0 specifies that the max_num_reorder_pics[ ] and max_latency_increase_plus1[ ] syntax elements may be present in the i-th dpb_parameters( ) syntax strucures the VPS.
dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vps_max_sublayers_minus1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.
layer_output_dpb_params_idx[ i ] specifies the index, to the list of dpb_parameters( ) syntax structures in the VPS, of the dpb_parameters( ) syntax structure that applies to the i-th layer when it is an output layer in an OLS. When present, the value of TABLE 5-continued layer_output_dpb_params_idx[ i ] shall be in the range of 0 to vps_num_dpb_params – 1,
inclusive.
If vps_independent_layer_flag[ i ] is equal to 1, the dpb_parameters( ) syntax structure that
applies to the i-th layer when it is an output layer is the dpb_parameters( ) syntax structure
present in the SPS referred to by the layer.
Otherwise (vps_independent_layer_flag[ i ] is equal to 0), the following applies:
-       When vps_num_dpb_params is equal to 1, the value of
        layer_output_dpb_params_idx[ i ] is inferred to be equal to 0.
-       It is a requirement of bitstream conformance that the value of
        layer_output_dpb_params_idx[ i ] shall be such that
        dpb_size_only_flag[ layer_output_dpb_params_idx[ i ] ] is equal to 0.
layer_nonoutput_dpb_params_idx[ i ] specifies the index, to the list of dpb_parameters( )
syntax structures in the VPS, of the dpb_parameters( ) syntax structure that applies to the i-th
layer when it is a non-output layer in an OLS. When present, the value of
layer_nonoutput_dpb_params_idx[ i ] shall be in the range of 0 to vps_num_dpb_params – 1,
inclusive.
If same_dpb_size_output_or_nonoutput_flag is equal to 1, the following applies:
-       If vps_independent_layer_flag[ i ] is equal to 1, the dpb_parameters( ) syntax structure
        that applies to the i-th layer when it is a non-output layer is the dpb_parameters( )
        syntax structure present in the SPS referred to by the layer.
-       Otherwise (vps_independent_layer_flag[ i ] is equal to 0), the value of
        layer_nonoutput_dpb_params_idx[ i ] is inferred to be equal to
        layer_output_dpb_params_idx[ i ].
Otherwise (same_dpb_size_output_or_nonoutput_flag is equal to 0), when
vps_num_dpb_params is equal to 1, the value of layer_output_dpb_params_idx[ i ] is
inferred to be equal to 0.

For example, the syntax element vps_num_dpb_params may indicate the number of dpb_parameters( ) syntax structures in the VPS. For example, the value of vps_num_dpb_params may be in the range of 0 to 16. Also, when the syntax element vps_num_dpb_params is not present, the value of the syntax element vps_num_dpb_params may be inferred equal to 0.

Also, for example, the syntax element same_dpb_size_output_or_nonoutput_flag may indicate whether the syntax element layer_nonoutput_dpb_params_idx[i] may be present in the VPS. For example, when the value of the syntax element same_dpb_size_output_or_nonoutput_flag is 1, the syntax element same_dpb_size_output_or_nonoutput_flag may indicate that there is no syntax element layer_nonoutput_dpb_params_idx[i] in the VPS, and when the value of the syntax element same_dpb_size_output_or_nonoutput_flag is 0, the syntax element same_dpb_size_output_or_nonoutput_flag may indicate that the syntax element layer_nonoutput_dpb_params_idx[i] may be present in the VPS.

Also, for example, the syntax element vps_sublayer_dpb_params_present_flag may be used to control the presence of syntax elements max_dec_pic_buffering_minus1[ ], max_num_reorder_pics[ ] and max_latency_increase_plus1[ ] in the dpb_parameters( ) syntax structure of the VPS. Also, when the syntax element vps_sublayer_dpb_params_present_flag is not present, the value of the syntax element vps_sublayer_dpb_params_present_flag may be inferred equal to 0.

Also, for example, the syntax element dpb_size_only_flag[i] may indicate whether the syntax elements max_num_reorder_pics[ ] and max_latency_increase_plus1[ ] may be present in the i-th dpb_parameters( ) syntax structure of the VPS. For example, when the value of the syntax element dpb_size_only_flag[i] is 1, the syntax element dpb_size_only_flag[i] may indicate that the syntax elements max_num_reorder_pics[ ] and max_latency_increase_plus1[ ] are not present in the i-th dpb_parameters( ) syntax structure of the VPS. When the value of the syntax element dpb_size_only_flag[i] is 0, the syntax element dpb_size_only_flag[i] may indicate that the syntax elements max_num_reorder_pics[ ] and max_latency_increase_plus1[ ] may be present in the i-th dpb_parameters( ) syntax structure of the VPS.

Also, for example, the syntax element dpb_max_temporal_id[i] may indicate the TemporalId of the highest sublayer representation in which the DPB parameter may be present in the i-th dpb_parameters( ) syntax structure in the VPS. Also, the value of dpb_max_temporal_id[i] may be in the range of 0 to vps_max_sublayers_minus1. Also, for example, when the value of vps_max_sublayers_minus1 is 0, the value of dpb_max_temporal_id[i] may be inferred as 0. Also, for example, when the value of vps_max_sublayers_minus1 is greater than 0 and vps_all_layers_same_num_sublayers_flag is 1, the value of dpb_max_temporal_id[i] may be inferred equal to vps_max_sublayers_minus1.

Also, for example, the syntax element layer_output_dpb_params_idx[i] may specify the index of the dpb_parameters( ) syntax structure applied to the i-th layer, which is the output layer of the OLS to the list of the dpb_parameters( ) syntax structure in the VPS. When the syntax element layer_output_dpb_params_idx[i] is present, the value of the syntax element layer_output_dpb_params_idx[i] may be in the range of 0 to vps_num_dpb_params–1.

For example, when vps_independent_layer_flag[i] is 1, it may be a dpb_parameters( ) syntax structure in the SPS referenced by dpb_parameters( ) syntax structure layer applied to the i-th layer, which is the output layer.

Alternatively, for example, when vps_independent_layer_flag[i] is 0, the following content may be applied.

When vps_num_dpb_params is 1, the value of layer_output_dpb_params_idx[i] may be inferred as 0.

It is a requirement of bitstream conformance that the value of layer_output_dpb_params_idx[i] causes the value of dpb_size_only_flag[layer_output_dpb_params_idx[i]] to be 0.

Also, for example, the syntax element layer_nonoutput_dpb_params_idx[i] may specify the index of the dpb_parameters( ) syntax structure applied to the i-th layer, which is a non-output layer of the OLS to the list of the dpb_parameters( ) syntax structure in the VPS. When the syntax element layer_nonoutput_dpb_params_idx[i] is present, the value of the syntax element layer_nonoutput_dpb_params_idx[i] may be in the range of 0 to vps_num_dpb_params−1.

For example, when same_dpb_size_output_or_nonout-put_flag is 1, the following content may be applied.

When vps_independent_layer_flag[i] is 1, it may be a dpb_parameters( ) syntax structure in the SPS referenced by the layer of the dpb_parameters( ) syntax structure applied to the i-th layer, which is the non-output layer.

When vps_independent_layer_flag[i] is 0, the value of layer_nonoutput_dpb_params_idx[i] may be inferred equal to layer_output_dpb_params_idx[i].

Alternatively, for example, when same_dpb_size_outpu-t_or_nonoutput_flag is 0, if vps_num_dpb_params is 1, the value of layer_output_dpb_params_idx[i] may be inferred as 0.

Meanwhile, for example, the dpb_parameters( ) syntax structure, which is the DPB parameter syntax structure disclosed in Table 4 above, may be as follows.

TABLE 6

|  | Descriptor |
|---|---|
| dpb_parameters( dpbSizeOnlyFlag, maxSubLayersMinus1, subLayerInfoFlag )<br>{<br>  for( i = ( subLayerInfoFlag ? 0 : maxSubLayersMinus1 );<br>     i <= maxSubLayersMinus1; i++ ) {<br>    max_dec_pic_buffering_minus1[ i ] |  |
|  | ue(v) |
|     if( !dpbSizeOnlyFlag ) { |  |
|       max_num_reorder_pics[ i ] | ue(v) |
|       max_latency_increase_plus1[ i ] | ue(v) |
|     }<br>  }<br>} |  |

Referring to Table 6, the dpb_parameters( ) syntax structure may provide information on the DPB size for each CLVS of the CVS, the maximum picture reorder number, and the maximum latency. The dpb_parameters( ) syntax structure may represent information on DPB parameters or DPB parameter information.

When the dpb_parameters( ) syntax structure is included in the VPS, the OLS to which the dpb_parameters( ) syntax structure is applied may be specified by the VPS. In addition, when the dpb_parameters( ) syntax structure is included in the SPS, the dpb_parameters( ) syntax structure may be applied to an OLS including only the lowest layer among the layers referring to the SPS, wherein the lowest layer may be an independent layer.

Semantics for the syntax elements shown in Table 6 above may be as follows.

TABLE 7 max_dec_pic_buffering_minus1[ i ] plus 1 specifies, for each for each CLVS of the CVS, the maximum required size of the DPB in units of picture storage buffers when Htid is equal to i. The value of max_dec_pic_buffering_minus1[ i ] shall be in the range of 0 to MaxDpbSize − 1, inclusive, where MaxDpbSize is as specified in clause A.4.2. When i is greater than 0, max_dec_pic_buffering_minus1[ i ] shall be greater than or equal to max_dec_pic_buffering_minus1[ i − 1 ]. When max_dec_pic_buffering_minus1[ i ] is not present for i in the range of 0 to maxSubLayersMinus1 − 1, inclusive, due to subLayerInfoFlag being equal to 0, it is inferred to be equal to max_dec_pic_buffering_minus1[ maxSubLayersMinus 1 ].

max_num_reorder_pics[ i ] specifies, for each CLVS of the CVS, the maximum allowed number of pictures of the CLVS that can precede any picture in the CLVS in decoding order and follow that picture in output order when Htid is equal to i. The value of max_num_reorder_pics[ i ] shall be in the range of 0 to max_dec_pic_buffering_minus1[ i ], inclusive. When i is greater than 0, max_num_reorder_pics[ i ] shall be greater than or equal to max_num_reorder_pics[ i − 1 ]. When max_num_reorder_pics[ i ] is not present for i in the range of 0 to maxSubLayersMinus1 − 1, inclusive, due to subLayerInfoFlag being equal to 0, it is inferred to be equal to max_num_reorder_pics[ maxSubLayersMinus1 ].

max_latency_increase_plus1[ i ] not equal to 0 is used to compute the value of MaxLatencyPictures[ i ], which specifies, for each CLVS of the CVS, the maximum number of pictures in the CLVS that can precede any picture in the CLVS in output order and follow that picture in decoding order when Htid is equal to i.

When max_latency_increase_plus1[ i ] is not equal to 0, the value of MaxLatencyPictures[ i ] is specified as follows:

MaxLatencyPictures[ i ] = max_num_reorder_pics[ i ] + max_latency_increase_plus1[ i ] − 1    (7-73)

When max_latency_increase_plus1[ i ] is equal to 0, no corresponding limit is expressed.

The value of max_latency_increase_plus1[ i ] shall be in the range of 0 to $2^{32} - 2$, inclusive.

When max_latency_increase_plus1[ i ] is not present for i in the range of 0 to

TABLE 7-continued maxSubLayersMinus1 − 1, inclusive, due to subLayerInfoFlag being equal to 0, it is inferred
to be equal to max_latency_increase_plus1[ maxSubLayersMinus1 ].

For example, a value obtained by adding 1 to the syntax element max_dec_pic_buffering_minus1[i] may represent the maximum required size of the DPB in units of picture storage buffers when Htid is equal to i for each CLVS of CVS. For example, max_dec_pic_buffering_minus1[i] may be information on the DPB size. For example, the value of the syntax element max_dec_pic_buffering_minus1[i] may be in the range of 0 to MaxDpbSize−1. Also, for example, when i is greater than 0, max_dec_pic_buffering_minus1[i] may be greater than or equal to max_dec_pic_buffering_minus1[i−1]. Also, for example, when max_dec_pic_buffering_minus1[i] is not present for i in the range of 0 to maxSubLayersMinus1−1, the value of the syntax element max_dec_pic_buffering_minus1 [i] may be inferred equal to max_dec_pic_buffering_minus1[maxSubLayersMinus1] since subLayerInfoFlag is 0.

Also, for example, the syntax element max_num_reorder_pics[i] may represent the maximum allowed number of pictures of the CLVS that can precede all pictures of the CLVS in decoding order and follow those pictures in output order when Htid is equal to i for each CLVS of the CVS. For example, max_num_reorder_pics[i] may be information on the maximum picture reorder number of the DPB. The value of max_num_reorder_pics[i] may be in the range of 0 to max_dec_pic_buffering_minus1[i]. Also, for example, when i is greater than 0, max_num_reorder_pics[i] may be greater than or equal to max_num_reorder_pics[i−1]. Also, for example, when max_num_reorder_pics[i] is not present for i in the range of 0 to maxSubLayersMinus1-1, the syntax element max_num_reorder_pics[i] may be inferred equal to max_num_reorder_pics[maxSubLayersMinus1]since subLayerInfoFlag is 0.

Also, for example, the syntax element max_latency_increase_plus1[i] whose value is not 0 may be used to calculate the value of MaxLatencyPictures[i]. The MaxLatencyPictures[i] may represent the maximum number of pictures of the CLVS that can precede all pictures of the CLVS in output order and follow those pictures in decoding order when Htid is equal to i for each CLVS of the CVS. For example, max_latency_increase_plus1[i] may be information on the maximum latency of the DPB.

For example, when max_latency_increase_plus1[i] is not 0, the value of MaxLatencyPictures[i] may be derived as follows.

$$MaxLatencyPictures[i] = \text{max\_num\_reorder\_pics}[i] + \text{max\_latency\_increase\_plus1}[i] - 1 \qquad \text{[Equation 1]}$$

On the other hand, for example, if max_latency_increase_plus1[i] is 0, the corresponding limit may not be expressed. The value of max_latency_increase_plus1[i] may be in the range of 0 to $2^{32}−2$. Also, for example, when max_latency_increase_plus1[i] is not present for i in the range of 0 to maxSubLayersMinus1-1, the syntax element max_latency_increase_plus1[i] may be inferred equal to max_latency_increase_plus1[maxSubLayersMinus1]since subLayerInfoFlag is 0.

The above-described DPB management may be performed based on the information/syntax element related to the above-described DPB parameter. other DPB parameter(s) may be signaled depending on whether the current layer is an output layer or a reference layer, or other DPB parameter(s) may be signaled depending on whether the DPB (or DPB parameter) is for OLS (mapped to OLS).

Meanwhile, although not illustrated in FIG. 4, the encoding apparatus may decode the current picture based on the updated/managed DPB. In addition, the decoded current picture may be inserted into the DPB, and the DPB including the decoded current picture may be updated based on the DPB parameter before decoding the next picture of the current picture in decoding order.

FIG. 5 exemplarily illustrates a decoding procedure according to an embodiment of the present disclosure.

The decoding apparatus obtains image information including information related to the DPB parameter from the bitstream (S500). The decoding apparatus may obtain image information including information related to the DPB parameter. The information/syntax element related to the DPB parameter may be as described above.

The decoding apparatus manages the DPB based on the DPB parameter (S510). Here, DPB management may be referred to as DPB update. The DPB management process may include a process of marking and/or removing a decoded picture in the DPB. The decoding apparatus may derive the DPB parameter based on the information related to the DPB parameter, and may perform the DPB management process based on the derived DPB parameter.

The decoding apparatus decodes/outputs the current picture based on the DPB (S520). The decoding apparatus may decode the current picture based on the updated/managed DPB. For example, a block/slice in the current picture may be decoded based on inter prediction using a (previously) decoded picture in the DPB as a reference picture.

Figure 6:
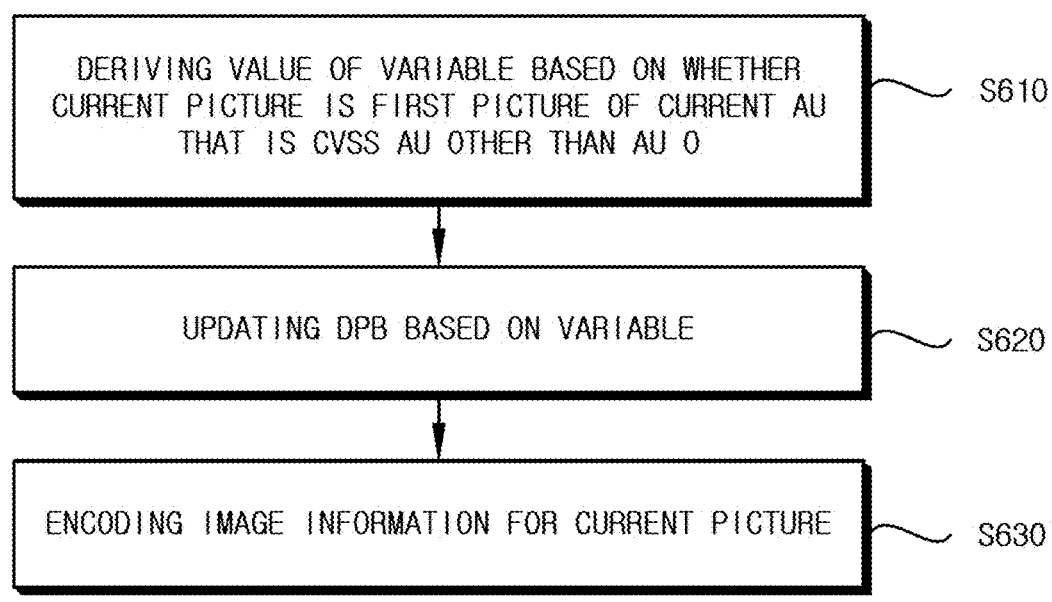
FIG. 6 briefly illustrates an image encoding method performed by an encoding apparatus according to the present disclosure.

FIG. 6 schematically illustrates an image encoding method by an encoding apparatus according to the present disclosure. The method disclosed in FIG. 6 may be performed by the encoding apparatus illustrated in FIG. 2. Specifically, for example, S600 to S610 of FIG. 6 may be performed by the DPB of the encoding apparatus, and S620 may be performed by the entropy encoder of the encoding apparatus. Also, although not illustrated, the process of decoding the current picture may be performed by the predictor and the residual processor of the encoding apparatus.

The encoding apparatus derives the value of the variable based on whether the current picture is the first picture of the current access unit (AU) that is a coded video sequence start access unit (CVSS AU) other than AU 0 (S600). The encoding apparatus may derive the value of the variable to update the DPB before decoding the current picture and after generating/encoding a slice header for the current picture. The DPB may include a picture decoded before the current picture.

For example, the encoding apparatus may derive the value of the variable based on whether the current picture is the first picture of the current access unit (AU) that is CVSS AU other than AU 0. Here, the variable may indicate whether all picture storage buffers in a decoded picture buffer (DPB) are emptied without output. The current AU may be an AU including the current picture. Also, for example, the AU 0 may be the first AU of the bitstream in decoding order. That is, for example, the AU 0 may be the first AU of the bitstream to be decoded. On the other hand, the encoding apparatus may generate/encode the slice header for the current picture, and then derive the value of the variable based on whether the current picture is the first picture of the current access unit (AU) that is CVSS AU other than AU 0.

For example, the encoding apparatus may determine whether the current picture is the first picture of a current access unit (AU) that is a CVSS AU other than AU 0. When the current AU is the CVSS AU other than the AU 0 and the current picture is the first picture of the current AU, the encoding apparatus may derive the value of the variable.

For example, when the current AU is the CVSS AU other than the AU 0 and the current picture is the first picture of the current AU, the encoding apparatus may determine whether at least one of the parameters for the current AU is different from parameters for a preceding AU of the current AU in decoder order. When at least one of the parameters for the current AU is different from the parameters for the previous AU, the value of the variable may be set equal to 1, and when the parameters for the current AU are the same as the parameters for the preceding AU, the value of the variable may be set equal to the value of the syntax element for the variable. The encoding apparatus may generate/encode image information for the current picture, and the image information may include the syntax element. The syntax element may be the above-described ph_no_output_of_prior_pics_flag. In addition, the parameters for the current AU include a parameter for the maximum picture width, a parameter for the maximum picture height, a parameter for an available chroma format, a parameter for the maximum bit depth, and a parameter for the maximum DPB size. The parameter for the maximum picture width, the parameter for the maximum picture height, the parameter for the available chroma format, the parameter for the maximum bit depth, and the parameter for the maximum DPB size may be PicWidthMaxInSamplesY, PicHeightMaxInSamplesY, MaxChromaFormat, MaxBitDepthMinus8, and max_dec_pic_buffering_minus1[Htid] described above, respectively.

On the other hand, for example, when the current AU is not the CVSS AU or the current picture is not the first picture of the current access unit (AU) that is the CVSS AU other than AU 0, the encoding apparatus may not derive the value of the variable.

Through this, the variable may be derived only before decoding of the current picture, which is the first picture of the current AU, not before decoding of all pictures of the current AU that is the CVSS AU other than AU 0. The process in which all picture storage buffers in a decoded picture buffer (DPB) are emptied without output may be performed only before decoding of the current picture, which is the first picture of the current AU.

The encoding apparatus updates the DPB based on the variable (S610). For example, the encoding apparatus may update the DPB based on the variable.

For example, when the value of the variable is 1, all picture storage buffers in the DPB may be emptied without output, and DPB fullness may be set equal to 0. Also, for example, when the value of the variable is 0, the picture storage buffer including a specific picture in the DPB may be emptied without output, and a bumping process may be performed on the non-empty picture storage buffer in the DPB. Also, the DPB fullness may be set to be 0. Here, for example, the specific picture may be a picture marked as "not needed for output" and "unused for reference". The bumping process may be as described above.

Also, for example, when the current picture is not the first picture of the current AU that is the CVSS AU other than the AU 0, the encoding apparatus may remove, from the DPB, a specific picture that satisfies the first condition and the second condition in the DPB. Here, the first condition may be that the specific picture is a picture marked as "unused for reference", and the second condition may be that the specific picture has a picture output flag equal to 0 or the DPB output time (DPB) of the specific picture is less than or equal to the CPB removal time of the first decoding unit (DU) of the current picture. Here, the picture output flag may be PictureOutputFlag described above.

Also, for example, when the current picture is not the first picture of the current AU that is the CVSS AU other than the AU 0, the picture storage buffer including the specific picture in the DPB may be emptied without output. Here, the specific picture may be a picture marked as "not needed for output" and "unused for reference". Also, the DPB fullness may be decremented by 1 for the picture storage buffer that is emptied. That is, for example, the DPB fullness may be decremented by 1 whenever the picture storage buffer is emptied. In addition, when one or more conditions described below is true, the above-described bumping process may be repeatedly performed while further decrementing the DPB fullness by 1 for each additional picture storage buffer that is emptied, until all of the conditions are not true.

For example, the first condition may be that the number of pictures in the DPB marked as "needed for output" is greater than the syntax element max_num_reorder_pics [Htid] for the current AU. The second condition may be that the syntax element max_latency_increase_plus1[Htid] for the current AU is not equal to 0 and there is at least one picture in the DPB that is marked as "needed for output" and for which the associated variable PicLatencyCount is greater than or equal to MaxLatencyPictures[Htid]. The third condition may be that the number of pictures in the DPB is greater than or equal to a value obtained by adding 1 to the syntax element max_dec_pic_buffering_minus1 [Htid] for the current AU. The image information may include the syntax element for the current AU.

The encoding apparatus encodes the image information for the current picture (S620). The encoding apparatus may encode image information including the syntax element for updating the DPB. Also, the image information may include a slice header for the current picture.

Meanwhile, although not illustrated, the encoding apparatus may decode the current picture based on the updated DPB. For example, the encoding apparatus may derive a prediction sample by performing inter prediction on a block in the current picture based on the reference picture of the DPB, and may generate a reconstructed sample and/or a reconstructed picture for the current picture base on the prediction sample. Meanwhile, for example, the encoding apparatus may derive a residual sample for the block in the current picture, and may generate a reconstructed sample and/or a reconstructed picture through addition of the prediction sample and the residual sample. As described above, an in-loop filtering procedure such as deblocking filtering, SAO, and/or ALF procedures may be applied to the reconstructed samples in order to improve subjective/objective picture quality. The encoding apparatus may generate/encode prediction-related information and/or residual information for the block, and the image information may include the prediction-related information and/or the residual information. Also, the encoding apparatus may insert the decoded current picture into the DPB. Also, for example, the encoding apparatus may derive a DPB parameter for the current AU and may generate DBP-related information for the DPB parameter. The image information may include the DBP-related information.

Meanwhile, the bitstream including the image information may be transmitted to the decoding apparatus through a network or a (digital) storage medium. Here, the network may include a broadcasting network and/or a communication network, and the digital storage medium may include various storage media such as USB, SD, CD, DVD, Blu-ray, HDD, and SSD.

Figure 7:
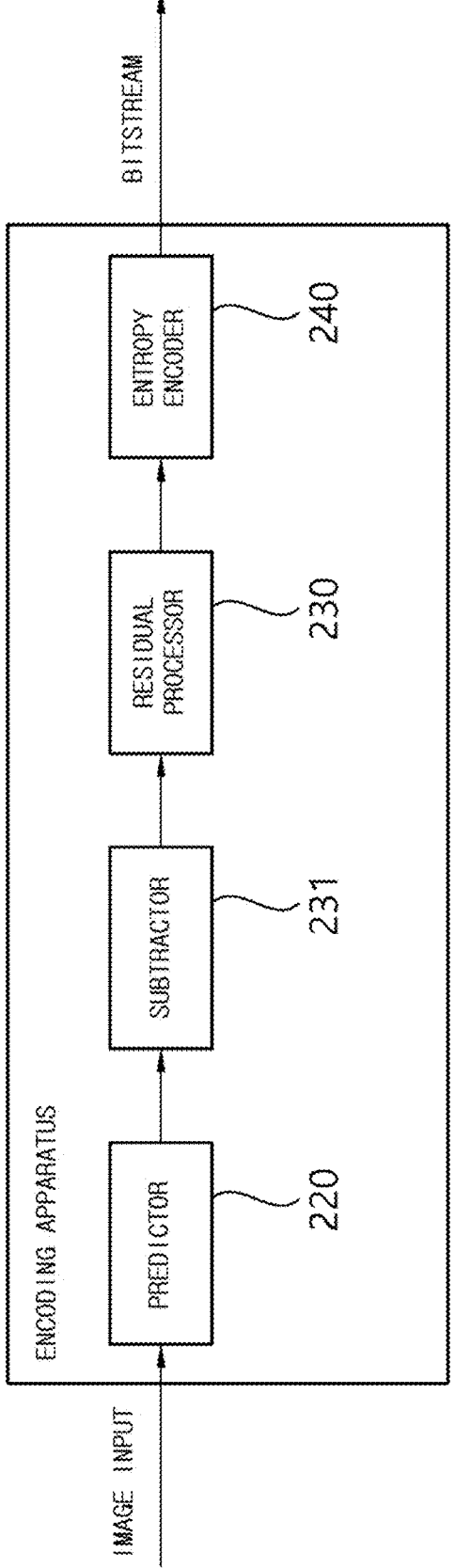
FIG. 7 briefly illustrates an encoding apparatus for performing an image encoding method according to the present disclosure.

FIG. 7 schematically illustrates an encoding apparatus for performing an image encoding method according to the present disclosure. The method disclosed in FIG. 7 may be performed by the encoding apparatus disclosed in FIG. 6. Specifically, for example, the DPB of the encoding apparatus of FIG. 7 may perform S600 to S610, and the entropy encoder of the encoding apparatus of FIG. 7 may perform S620. Also, although not illustrated, the process of decoding the current picture may be performed by the predictor and the residual processor of the encoding apparatus.

Figure 8:
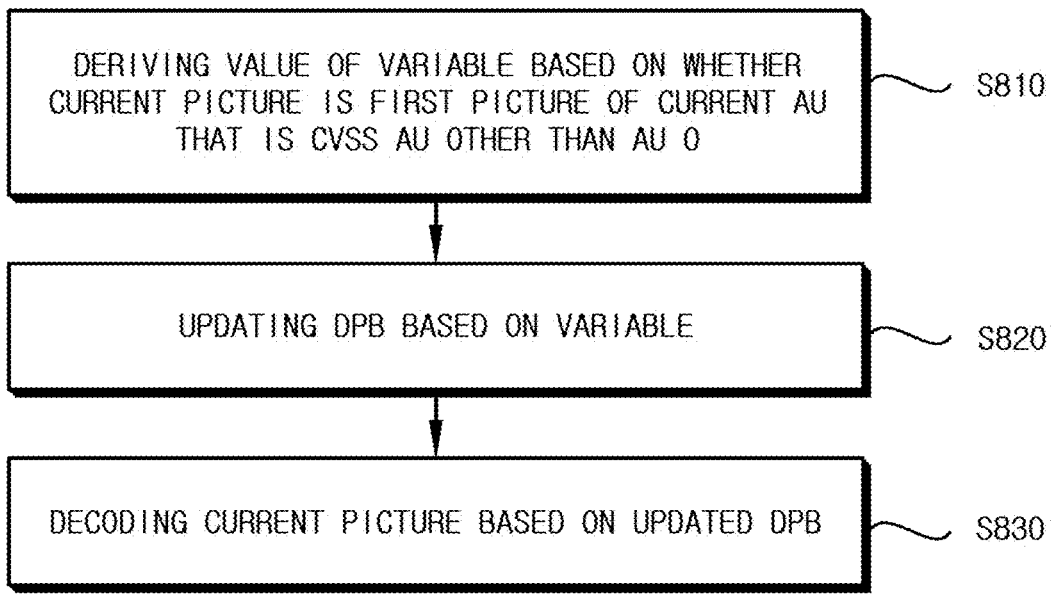
FIG. 8 briefly illustrates an image decoding method performed by a decoding apparatus according to the present disclosure.

FIG. 8 schematically illustrates an image decoding method by a decoding apparatus according to the present disclosure. The method disclosed in FIG. 8 may be performed by the decoding apparatus illustrated in FIG. 3. Specifically, for example, S800 to S810 of FIG. 8 may be performed by the DPB of the decoding apparatus, and S820 of FIG. 8 may be performed by the predictor and the residual processor of the decoding apparatus.

The decoding apparatus derives the value of the variable based on whether the current picture is the first picture of the current access unit (AU) that is a coded video sequence start access unit (CVSS) AU other than AU 0 (S800). The decoding apparatus may derive the value of the variable based on whether the current picture is the first picture of the current access unit (AU) that is CVSS AU other than AU 0. Here, the variable may indicate whether all picture storage buffers in a decoded picture buffer (DPB) are emptied without output. The current AU may be an AU including the current picture. Also, for example, the AU 0 may be the first AU of the bitstream in decoding order. That is, for example, the AU 0 may be the first AU of the bitstream to be decoded by the decoding apparatus. On the other hand, the decoding device may parse the slice header for the current picture, and then may derive the value of the variable based on whether the current picture is the first picture of the current access unit (AU) that is CVSS AU other than AU 0.

For example, the decoding apparatus may determine whether the current picture is the first picture of a current access unit (AU) that is CVSS AU other than AU 0. When the current AU is the CVSS AU other than the AU 0 and the current picture is the first picture of the current AU, the decoding apparatus may derive the value of the variable.

For example, when the current AU is the CVSS AU other than the AU 0 and the current picture is the first picture of the current AU, the decoding apparatus may determine whether at least one of the parameters for the current is different from the parameters for a preceding AU of the current AU in decoding order. When at least one of the parameters for the current AU is different from the parameters for the preceding AU, the value of the variable may be set equal to 1. When the parameters for the current AU are the same as the parameters for preceding AU, the value of the variable may be set equal to the value of the syntax element signaled for the variable. The decoding apparatus may obtain image information for the current picture, and the image information may include the syntax element. The syntax element may be the above-described ph_no_output_of_prior_pics_flag. In addition, the parameters for the current AU include a parameter for the maximum picture width, a parameter for the maximum picture height, a parameter for an available chroma format, a parameter for the maximum bit depth, and a parameter for the maximum DPB size. The parameter for the maximum picture width, the parameter for the maximum picture height, the parameter for the available chroma format, the parameter for the maximum bit depth, and the parameter for the maximum DPB size may be PicWidthMaxInSamplesY, PicHeightMaxInSamplesY, MaxChromaFormat, MaxBitDepthMinus8, and max_dec_pic_buffering_minus1[Htid] described above, respectively.

On the other hand, for example, when the current AU is not a CVSS AU or the current picture is not the first picture of a current access unit (AU) that is the CVSS AU other than the AU 0, the decoding apparatus may not derive the value of the variable.

Through this, the variable may be derived only before decoding of the current picture, which is the first picture of the current AU, not before decoding of all pictures of current AU that is the CVSS AU other than the AU 0. The process in which all picture storage buffers in a decoded picture buffer (DPB) are emptied without output may be performed only before decoding of the current picture, which is the first picture of the current AU.

The decoding apparatus updates the DPB based on the variable (S810). For example, the decoding apparatus may update the DPB based on the variable. Before being updated, the DPB may include a picture decoded before the current picture.

For example, when the value of the variable is 1, all picture storage buffers in the DPB may be emptied without output, and DPB fullness may be set equal to 0. Also, for example, when the value of the variable is 0, the picture storage buffer including a specific picture in the DPB may be emptied without output, and a bumping process may be performed on the non-empty picture storage buffer in the DPB. Also, the DPB fullness may be set equal to 0. Here, for example, the specific picture may be a picture marked as "not needed for output" and "unused for reference". The bumping process may be as described above.

Also, for example, when the current picture is not the first picture of the current AU that is the CVSS AU other than the AU 0, the decoding apparatus may remove, from the DPB, a specific picture that satisfies the first condition and the second condition in the DPB. Here, the first condition may be that the specific picture is a picture marked as "unused for reference". The second condition may be that the specific picture has a picture output flag equal to 0 or the DPB output time (DPB) of the specific picture is less than or equal to the CPB removal time of the first decoding unit (DU) of the current picture. Here, the picture output flag may be PictureOutputFlag described above.

Also, for example, when the current picture is not the first picture of the current AU that is the CVSS AU other than the AU 0, the picture storage buffer including the specific picture in the DPB may be emptied without output. Here, the specific picture may be a picture marked as "not needed for output" and "unused for reference". Also, the DPB fullness may be decremented by 1 for the picture storage buffer that is emptied. That is, for example, the DPB fullness may be decremented by 1 whenever the picture storage buffer is emptied. In addition, when at least one of the conditions described below is true, the above-described bumping process may be repeatedly performed while further decrementing the DPB fullness by 1 for each additional picture storage buffer that is emptied, until all of the conditions are not true.

For example, the first condition may be that the number of pictures in the DPB marked as "needed for output" is greater than the syntax element max_num_reorder_pics [Htid] for the current AU. The second condition may be that the syntax element max_latency_increase_plus1[Htid] for the current AU is not equal to 0 and there is at least one picture in the DPB that is marked as "needed for output" and for which the associated variable PicLatencyCount is greater than or equal to MaxLatencyPictures[Htid]. The third condition may be that the number of pictures in the DPB is greater than or equal to a value obtained by adding 1 to the syntax element max_dec_pic_buffering_minus1 [Htid] for the current AU. The image information may include the syntax element for the current AU.

The decoding apparatus decodes the current picture based on the updated DPB (S820). For example, the decoding apparatus may decode the current picture based on the updated DPB. For example, the decoding apparatus may derive a prediction sample by performing inter prediction on a block in the current picture based on the reference picture of the DPB, and may generate a reconstructed sample and/or a reconstructed picture for the current picture based on the prediction sample. Meanwhile, for example, the decoding apparatus may derive a residual sample for the block in the current picture based on residual information for the current picture received through a bitstream, and may generate a reconstructed sample and/or a reconstructed picture through addition of the prediction sample and the residual sample. The image information may include the residual information. Also, the decoding apparatus may insert the decoded current picture into the DPB.

As described above, an in-loop filtering procedure such as deblocking filtering, SAO, and/or ALF procedure may be applied to the reconstructed samples in order to improve subjective/objective picture quality as necessary thereafter.

Figure 9:
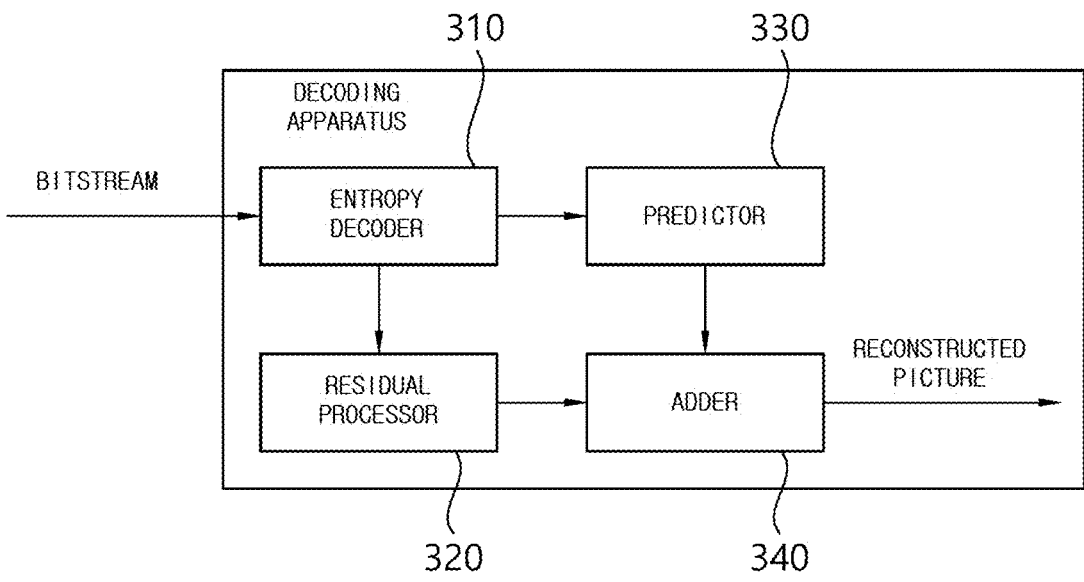
FIG. 9 briefly illustrates a decoding apparatus for performing an image decoding method according to the present disclosure.

FIG. 9 schematically illustrates a decoding apparatus for performing an image decoding method according to the present disclosure. The method disclosed in FIG. 8 may be performed by the decoding apparatus illustrated in FIG. 9. Specifically, for example, the DPB of the decoding apparatus of FIG. 9 may perform S800 to S810 of FIG. 8, and the predictor and the residual processor of the decoding apparatus of FIG. 9 may perform S820 of FIG. 8.

According to the present disclosure described above, whether to perform the process of removing pictures in the DPB without outputting them may be determined only before decoding of the first picture of CVSS AU other than AU 0, instead of being determined before decoding of all pictures of CVSS AU other than AU 0. Through this, the DPB state affecting all layers in the CVS may not be changed for each picture, and coding efficiency may be improved.

In addition, according to the present disclosure, a variable indicating whether to remove pictures in the DPB without outputting may be derived only before decoding of the first picture of CVSS AU other than AU 0, not before decoding all pictures of CVSS AU other than AU 0. Through this, the DPB state affecting all layers in the CVS may not be changed for each picture, and coding efficiency may be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 10:
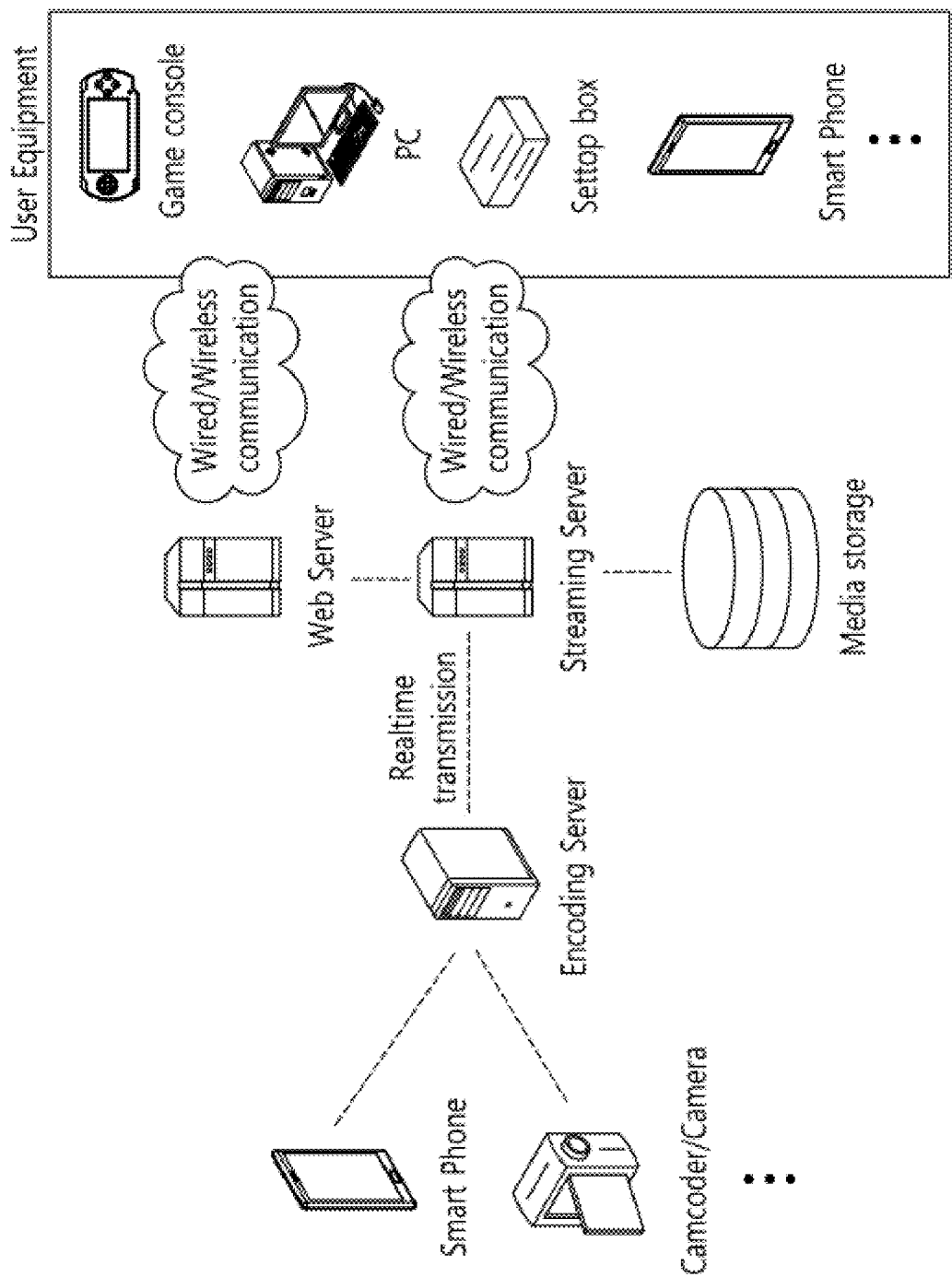
FIG. 10 illustrates a structural diagram of a contents streaming system to which the present disclosure is applied.

FIG. 10 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, comprising:
   deriving a value of a variable based on whether a current picture is a first picture of a current Access Unit (AU), the current AU being a Coded Video Sequence Start AU (CVSS AU) other than an AU 0, the variable indicating whether all picture storage buffers in a Decoded Picture Buffer (DPB) are emptied without output;
   updating the DPB based on the variable; and
   decoding the current picture based on the updated DPB, wherein the value of the variable is derived after parsing a slice header for the current picture.

2. The method of claim 1, wherein when the value of the variable is 1, the all picture storage buffers in the DPB are emptied without output, and DPB fullness is set equal to 0.

3. The method of claim 2, wherein when the value of the variable is 0, a picture storage buffer including a specific picture in the DPB is emptied without output, and a bumping process is performed on a non-empty picture storage buffer in the DPB, and
   wherein the specific picture is a picture marked as not needed for output and unused for reference.

4. The method of claim 1, wherein deriving the value of the variable comprises:
   when the current picture is the first picture of the current AU which is the CVSS AU other than the AU 0, determining whether at least one of parameters for the current AU is different from parameters for a preceding AU of the current AU in decoding order,
   wherein when the at least one of the parameters for the current AU is different from the parameters for the preceding AU, the value of the variable is set equal to 1, and
   wherein when the parameters for the current AU are the same as the parameters for the preceding AU, the value of the variable is set equal to a value of a syntax element signaled for the variable.

5. The method of claim 4, wherein the parameters for the current AU include a parameter for a maximum picture width, a parameter for a maximum picture height, a parameter for an available chroma format, a parameter for a maximum bit depth, and a parameter for a maximum DPB size for the current AU.

6. The method of claim 1, wherein updating the DPB comprises:
   when the current picture is not the first picture of the current AU which is the CVSS AU other than the AU 0, removing a specific picture that satisfies a first condition and a second condition from the DPB,
   wherein the first condition is that the specific picture is a picture marked as unused for reference,
   wherein the second condition is the specific picture has a picture output flag equal to 0 or a DPB output time of the specific picture is less than or equal to a CPB removal time of a first Decoding Unit (DU) of the current picture.

7. The method of claim 1, wherein when the current picture is not the first picture of the current AU which is the CVSS AU other than the AU 0, a picture storage buffer including a specific picture in the DPB is emptied without output, and
   wherein the specific picture is a picture marked as not needed for output and unused for reference.

8. An image encoding method performed by an encoding apparatus, comprising:
   deriving a value of a variable based on whether a current picture is a first picture of a current Access Unit (AU), the current AU being a Coded Video Sequence Start AU (CVSS AU) other than an AU 0, the variable indicating whether all picture storage buffers in a Decoded Picture Buffer (DPB) are emptied without output;
   updating the DPB based on the variable; and
   encoding image information for the current picture, wherein the value of the variable is derived after encoding a slice header for the current picture.

9. The method of claim 8, wherein when the value of the variable is 1, the all picture storage buffers in the DPB are emptied without output, and DPB fullness is set equal to 0.

10. The method of claim 9, wherein when the value of the variable is 0, a picture storage buffer including a specific picture in the DPB is emptied without output, and a bumping process is performed on a non-empty picture storage buffer in the DPB, and wherein the specific picture is a picture marked as not needed for output and unused for reference.

11. The method of claim 8, wherein deriving the value of the variable comprises:

when the current picture is the first picture of the current AU, which is the CVSS AU other than the AU 0, determining whether at least one of parameters for the current AU is different from parameters for a preceding AU of the current AU in decoding order, wherein when the at least one of the parameters for the current AU is different from the parameters for the preceding AU, the value of the variable is set equal to 1, wherein when the parameters for the current AU are the same as the parameters for the preceding AU, the value of the variable is set equal to a value of a syntax element for the variable, and wherein the image information includes the syntax element.

12. The method of claim 11, wherein the parameters for the current AU include a parameter for a maximum picture width, a parameter for a maximum picture height, a parameter for an available chroma format, a parameter for a maximum bit depth, and a parameter for a maximum DPB size for the current AU.

13. The method of claim 8, wherein updating the DPB comprises:

when the current picture is not the first picture of the current AU, which is the CVSS AU other than the AU 0, removing a specific picture that satisfies a first condition and a second condition from the DPB, wherein the first condition is that the specific picture is a picture marked as unused for reference, wherein the second condition is the specific picture has a picture output flag equal to 0 or a DPB output time of the specific picture is less than or equal to a CPB removal time of a first Decoding Unit (DU) of the current picture.

14. The method of claim 8, wherein when the current picture is not the first picture of the current AU which is the CVSS AU other than the AU 0, a picture storage buffer including a specific picture in the DPB is emptied without output, and wherein the specific picture is a picture marked as not needed for output and unused for reference.

15. A method for transmitting data for image information comprising:

deriving a value of a variable based on whether a current picture is a first picture of a current Access Unit (AU), the current AU being a Coded Video Sequence Start AU (CVSS AU) other than an AU 0, the variable indicating whether all picture storage buffers in a Decoded Picture Buffer (DPB) are emptied without output, the value of the variable being derived after encoding a slice header for the current picture;

updating the DPB based on the variable;

encoding image information for the current picture to generate a bitstream; and transmitting the data including the bitstream.

* * * * *